US008678291B2

(12) United States Patent
Bosquet et al.

(10) Patent No.: US 8,678,291 B2
(45) Date of Patent: Mar. 25, 2014

(54) SUPPORT THAT INCLUDES A DETACHABLE ELEMENT, A METHOD FOR THE DETACHMENT OF SUCH A DETACHABLE ELEMENT, AND METHOD FOR THE MANUFACTURE OF SUCH A SUPPORT

(75) Inventors: Olivier Bosquet, Vitre (FR); Gregory Simonneaux, Noyal sur Vilaine (FR)

(73) Assignee: Oberthur Technologies, Levallois Perret (FR)

( * ) Notice: Subject to any disclaimer, the term of this patent is extended or adjusted under 35 U.S.C. 154(b) by 397 days.

(21) Appl. No.: 13/076,372

(22) Filed: Mar. 30, 2011

(65) Prior Publication Data

US 2011/0240825 A1 Oct. 6, 2011

(30) Foreign Application Priority Data

Mar. 30, 2010 (FR) ...................................... 10 52339

(51) Int. Cl.
*G06K 19/06* (2006.01)

(52) U.S. Cl.
USPC ............ 235/492; 235/380; 235/487; 235/375

(58) Field of Classification Search
USPC ......... 235/492, 380, 487, 375; 283/61, 62, 67
See application file for complete search history.

(56) References Cited

U.S. PATENT DOCUMENTS

| 8,002,197 B1 * | 8/2011 | Whitaker ....................... 235/493 |
| 2007/0063052 A1 * | 3/2007 | Chakiris et al. ................ 235/486 |
| 2007/0108294 A1 | 5/2007 | Rossiter |

FOREIGN PATENT DOCUMENTS

| EP | 0 638 873 | 7/1994 |
| FR | 2 860 321 | 9/2003 |

* cited by examiner

Primary Examiner — Edwyn Labaze
(74) Attorney, Agent, or Firm — Cozen O'Connor (57) ABSTRACT

A support that includes a detachable element which has one border, of which at least a portion is attached to the support, with the border portions attached to the support all being so attached by weakened attachment seams, where the support also includes at least two lines of weakness that allow the support to be separated into at least two portions connected by a weakened attachment seam to the detachable element, with each of the lines of weakness being such that, when the support is bent along this line of weakness until it breaks, none of the weakened attachment seams breaks totally. Also disclosed is a method for the detachment of such a detachable element as well as a method for the manufacture of such a support.

22 Claims, 7 Drawing Sheets

SUPPORT THAT INCLUDES A DETACHABLE ELEMENT, A METHOD FOR THE DETACHMENT OF SUCH A DETACHABLE ELEMENT, AND METHOD FOR THE MANUFACTURE OF SUCH A SUPPORT

RELATED APPLICATIONS

This application claims the priority of French application no. 10 52339 filed Mar. 30, 2010, the entire content of which is hereby incorporated by reference.

BACKGROUND OF THE INVENTION

The invention relates to the general area of mini-cards that are manufactured in particular from plastic card.

The use of chip cards (smartcards), magnetic cards etc. is currently extremely widespread in daily life. Such cards are used, for example, as bank cards, identity cards, key cards, etc. and can come in various formats, according to their respective uses. As an example, the ID-1 format, with dimensions of 85.60 mm×53.98 mm×0.76 mm, is commonly used for bank cards, loyalty cards etc. For its part, the ID-000 format, with dimensions of 25 mm×15 mm, is the most used format for SIM (Subscriber Identity Module) cards in GSM or UMTS mobile telephones. The ID-1 and ID-000 formats are specified by the ISO/IEC 7816 standard.

The mini-cards of ID-000 format, for example, are generally manufactured from a card in the ID-1 format. To this end, a card body of ID-000 format is created in a card of ID-1 format, with the remainder of the card then acting as a support. The card body is then attached to the support so that it can be detached manually.

Figures 1A, 1B, 1C, 1D:
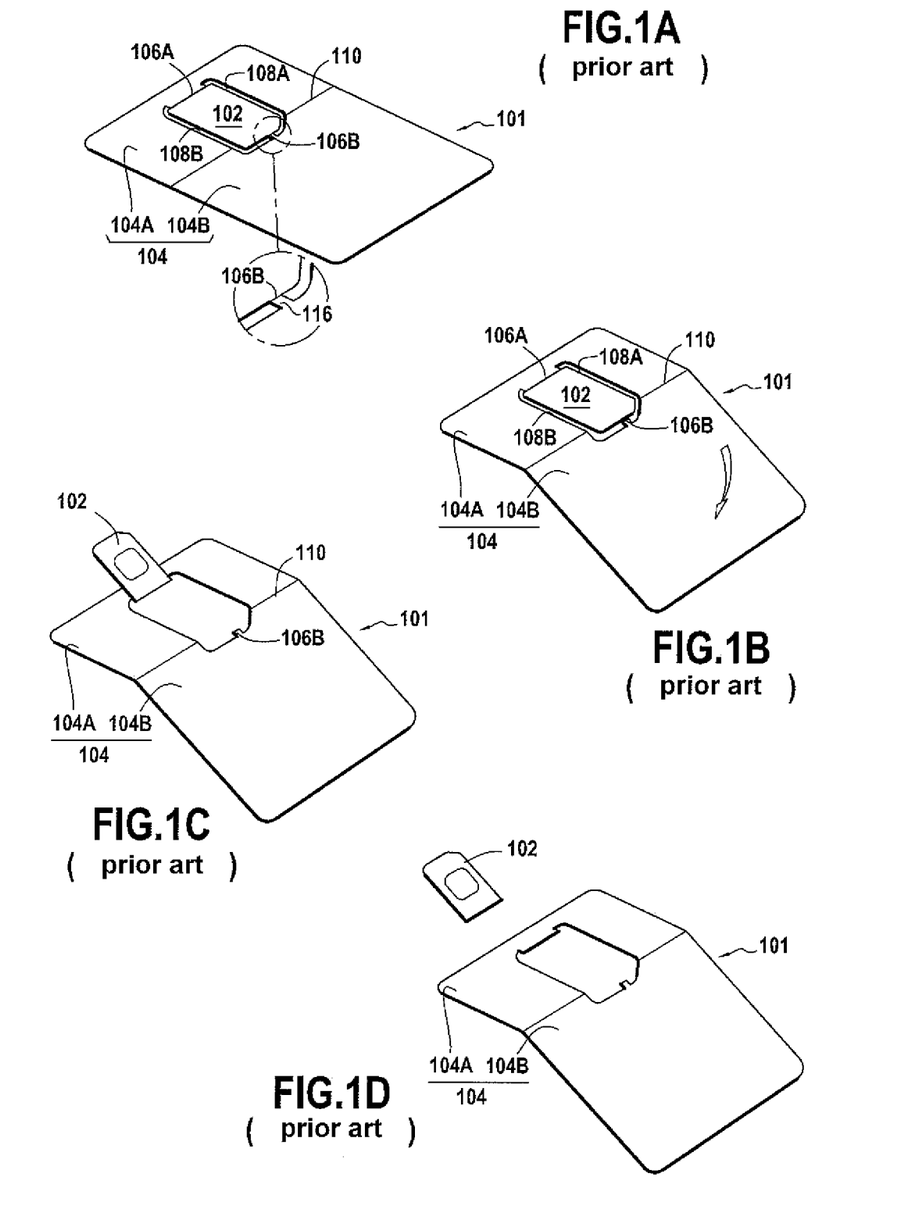
FIGS. 1A to 1D schematically represent a known card from the prior art, as well as the stages to be executed in order to detach it from the card body.

FIG. 1A represents an example of a mini-card of the SIM card type as described in the document entitled U.S. Pat. No. 5,936,227 (see. FIGS. 3, 4 and 5 of this document).

In this example, the card (101) is composed of a card body (102) (i.e. the SIM card), the latter being surrounded by a card support (104). Two portions (106A and 106B) of the outer border of the card body (102) act as attachment seams to the card support (104), with the portions (106A and 106B) being located at opposite ends. More particularly, portions 106A and 106B of the border of the card body (102) are weakened regions, each forming an attachment seam between the card body (102) and the card support (104), with these attachment seams being designed to be broken manually.

Attachment seam 106A is formed by a line of weakness. A line of weakness refers here to a line that has been weakened in relation to the surrounding area of the support (110).

Furthermore, portion 106B of the border of the card body (102) comprises a second line of weakness at the junction between a narrow fixing tab (116) and the card body (102). Border portion 106B is also parallel to border portion 106A.

In addition, the outer border of the card body (102) is separated from the card support (104) by two cut-out zones (108A and 108B) which each opens onto the attachment seams (106A and 106B). In other words, the border of the card body (102) is composed of:
 border portions 106A and 106B, and
 cut-out zones 108A and 108B.

A line of weakness (110) is also created on the card support (104) so that it is interrupted by cut-out zones 108A and 108B. This line of weakness (110) divides the card support (104) into two support portions, namely portion 104A with attachment seam 106A and portion 104B with attachment seam 106B. Moreover, line of weakness 110 is located close to attachment seam 106B so that, when support 104 is bent along the line of weakness (110), attachment seam 106B breaks totally and easily.

In this document, the breaking of an element (such as an attachment seam or a line of weakness for example) means the total breaking away of this element, unless otherwise indicated in the text. In other words, a broken attachment seam means that the attachment seam in question has totally broken away.

To detach the card body (102) from the card support (104), the user must first bend support portion 104B along the line of weakness (110), thus causing the breaking away of attachment seam 106B (FIG. 1B). Once border portion 106B of the card body (102) is clear, the user bends the card body (102) along attachment seam 106A in order to break the latter, thus freeing the card body (102) from its support (FIGS. 1C and 1D).

Figure 2:
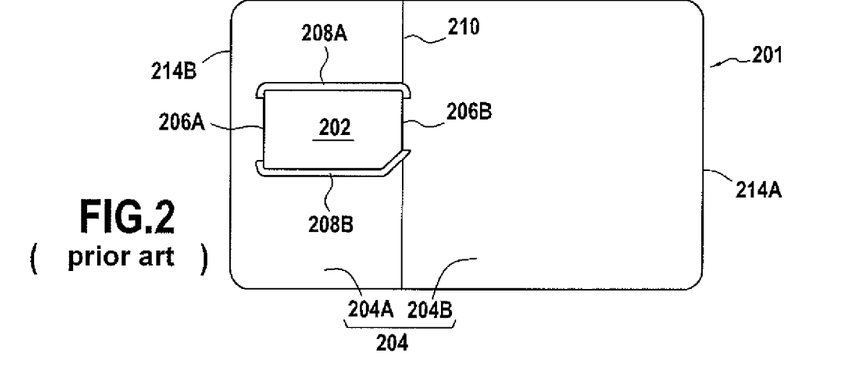
FIG. 2 represents a known alternative to the card of FIG. 1A.

FIG. 2 represents an alternative embodiment that is described in document U.S. Pat. No. 5,936,227 (see FIG. 13). This alternative differs from FIG. 1 in that attachment seam 206B is formed by almost the whole of one of the edges of the card body (202). In addition, the line of weakness (201) created in the card support (204) extends attachment seam 206B.

The card body (202) is detached from the card support (204) in the same manner as that indicated above with reference to card body 102.

The applicant has observed however that the manipulations to be effected in order to detach the card body in FIGS. 1 and 2 can give rise to high mechanical forces on this card body. These forces can then result in irreversible deformation or damage to any flush-mounted metal contacts on the card body for example.

Moreover, the design of cards 110 and 210 show several major defects.

In the case more particularly of card 210, it is necessary that line of weakness 210 should be placed in a median zone of the card support (204), so that the user can easily grasp portions 204A and 204B of the support and bend the latter along line of weakness 210. The configuration of the card (201) therefore does not allow the creation of a card body 202 of relatively large size in relation to the support (204). The relative size of the card body (202) should in fact be moderated in relation to that of the card (201) so that the line of weakness (210) is sufficiently far from the outer edges (214A and 214B) of the card support (204). Typically, the design of card 201 allows the manufacture of card bodies of ID-000 format from a card of ID-1 format.

In addition, so that the card body (202) can be detached easily from its support, the length and/or the robustness of attachment seam 206B must be limited. Typically, the cut-out zones (208A and 208B) run around well over half of the border of the card body (202) in all, which therefore limits the retention of the card body (202) in relation to the card support (204). It is for this reason that the card body (202) possesses a large degree of freedom in the attached position, that is when the card body (202) is attached to the support by the weakened attachment seams (206A and 206B). Thus, the card body (202) is liable to undergo high mechanical forces (bending forces, etc.) in the attached position, during manipulation of the card (201) for example. For example, if a force is applied accidentally at the centre of the card body (202) in the attached position, the latter is liable to be deformed by the bending forces, and possibly to suffer irreversible damage. Moreover, one of the attachment seams (206A or 206B) is liable to break accidentally if the force applied is too high (in particular attachment seam 206B which is shorter and therefore weaker than attachment seam 206A).

The more the cut-out zones (208A and 208B) enclose a higher proportion of the border of the card body (202), the greater the risk of deformation of the card body (202) and/or of accidentally breaking the weakened attachment seams (206A and 206B).

Furthermore, there currently exists a need for a support that allows the creation of a detachable element (such as a card body, for example) that is of relatively large size in relation to the support, while also ensuring good retention of the detachable element and limiting the mechanical forces generated in particular during the detachment of the detachable element from the support.

SUMMARY OF THE INVENTION

One aspect of the present invention is directed to a support that includes a detachable element which has one border, of which at least a portion is attached to the support, with the border portions attached to the support all being so attached by weakened attachment seams, where the support also includes at least two lines of weakness that allow the support to be separated into at least two portions that are connected by a weakened attachment seam to the detachable element, and with each of the lines of weakness being such that, when the support is bent along this line of weakness until it breaks, none of the weakened attachment seams breaks totally.

This present invention is advantageous in that it allows the creation of a detachable element (such as a card body, for example) of relatively large size in relation to the support, while also ensuring good retention of the detachable element in the attached position (i.e. attached to the support) and allowing easy detachment of the latter.

The invention can also advantageously allow the mechanical stresses imposed on the detachable element to be limited when the latter is detached from the support.

In one particular embodiment, at least one so-called free border portion of the detachable element is separated from the support by a cut-out zone.

Such cut-out zones can advantageously facilitate breaking of the lines of weakness and/or of the weakened attachment seam when the detachable element is detached from the support, while also limiting the mechanical stresses imposed on the detachable element.

In one particular embodiment, the free border portions form more than half of the border of the detachable element.

The border of the detachable element can include two so-called free border portions located opposite to each other in relation to the detachable element.

The opposite positioning of the free border portions allows the retention of the detachable element in the attached position to be optimised.

According to one aspect of the invention, the border of the detachable element can include curved portions, with these curved portions all forming part of the free border portions.

It is thus possible to avoid forming weakened attachment seams of curved form, since these are more difficult to create than rectilinear weakened attachment seams. The support thus only includes rectilinear weakened attachment seams, the latter also being easier to break when the detachable element is detached from its support.

The curved portions can also be the free border portions. In this event, only the curved border portions of the detachable element are separated from the support by a cut-out zone.

According to another aspect of the invention, the border of the detachable element can include angles, where these angles all form part of the free border portions.

These angles can also be the free border portions. In this event, only the border portions with an angle are separated from the support by a cut-out zone.

Alternatively, the detachable element can include at least one curved border portion and at least one angle. Moreover, each of these curved border portions and/or of these angles can be separated from the support by a cut-out zone.

Furthermore, at least one so-called cut-out zone can be connected to an outside edge of the support by one of the lines of weakness. A line of weakness thus connected to an outside edge of the support can be broken more easily, while also limiting the mechanical stresses imposed on the detachable element when the latter is detached from the support.

In one particular embodiment, each so-called cut-out zone is connected to an outside edge of the support by one of the lines of weakness.

In addition, the support can include two so-called weakened attachment seams, characterised in that at least the line of weakness that is closest to the said two weakened attachment seams is arranged so as to satisfy the following condition:

$$D1 = D2 \pm 20\%$$

D1 and D2 are the respective distances between the said at least one line of weakness and each of the two weakened attachment seams.

In this way, it is possible to ensure that when a line of weakness on the support is bent, none of the weakened attachment seams breaks totally.

In one particular method of implementation, the said at least one line of weakness is essentially equidistant from the said two weakened attachment seams.

In one particular embodiment, the support can include exactly two lines of weakness that are essentially parallel to each other. These two lines of weakness can also be aligned. The paralleling and the alignment of the lines of weakness allow the detachment of the detachable element from the support to be facilitated.

The support can also include exactly two lines of weakness located in a median region of the support. It is thus easier for a user to grasp the support on either side of the lines of weakness in order to break the latter.

In addition, at least one of the weakened attachment seams is formed by a line of weakness or by a narrow tab.

Furthermore, the detachable element can be a card (i.e. a card body).

The detachable element can also include a microcircuit and the means to communicate with an external device. These communication means can include, for example, at least one near-field communication antenna and/or flush-mounted electrical contacts.

In one particular embodiment, the detachable element is of more-or-less rectangular form so that the length (or the width respectively) of this detachable element represents at least half of the length (or the width respectively) of the support.

Another aspect of the present invention is directed to a method for the detachment of a detachable element included in a support, where the detachable element has one border, of which at least a portion is attached to the support, with the border portions attached to the support all being so attached by weakened attachment seams, where the support also includes at least two lines of weakness that allow the support to be separated into at least two portions connected by a weakened attachment seam to the detachable element, and with each of the lines of weakness being such that, when the support is bent along this line of weakness until it breaks, none of the weakened attachment seams breaks totally, and where the detachment method successively includes the following:

a stage for bending of the support along each of the lines of weakness until it breaks, and a stage for breaking of the weakened attachment seams so as to detach the detachable element from the support.

Another aspect of the present invention is directed to a method for the manufacture of a support that includes a detachable element, where the manufacturing method includes:

a stage for the creation of weakened attachment seams, attaching at least one portion of the border of the detachable element to the support, where the border portions of the detachable element attached to the support are all so attached by the weakened attachment seams, a stage for the creation of at least two lines of weakness that allow the support to be separated into at least two portions that are connected by a weakened attachment seam to the detachable element, with each of the lines of weakness being such that, when the support is bent along this line of weakness until it breaks, none of the weakened attachment seams breaks totally.

It will be seen that the advantages and comments listed with reference to the different embodiments of the support of the invention apply in the same manner to the detachment method and the manufacturing method of the invention.

DETAILED DESCRIPTION OF THE DRAWINGS

The invention concerns a support that includes a detachable element, where the detachable element is fixed to the support so that it can be detached manually. The invention particularly applies to a support of ID-1 format that includes a card body of ID-000 format. It will be understood however that the invention applies in the same manner to supports and detachable elements of any shape and size.

Figure 3:
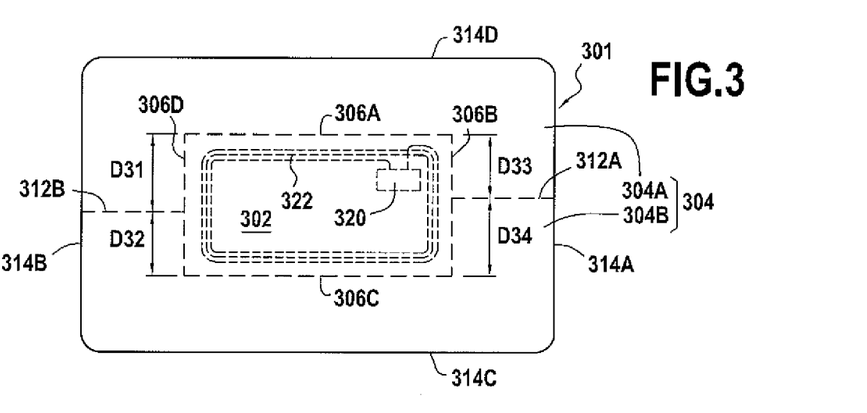
FIG. 3 schematically represents a support according to a first embodiment of the invention.

FIG. 3 represents a card (301) according to a first embodiment of the invention. In this example, the card (301) is composed of a support (304), where the latter includes a detachable element which here takes the form of a card body (302).

The detachable element (i.e. card body 302) in this example is essentially rectangular and has angles at each of its corners. The rectangular border of the card body (302) is thus composed of four rectilinear border portions denoted 306A, 306B, 306C and 306D (collectively denoted 306).

Furthermore, in this example, each of the border portions (306) of the card body (302) forms a weakened attachment seam between the card body and the support (304).

The support (304) also includes two lines of weakness (312A and 312B) that allow the support to be separated into two portions (304A and 304B) connected by a weakened attachment seam to the card body (302). More particularly, portion 304A of the support is connected to the card body (302) by weakened attachment seam 306A (and also by a portion of weakened attachment seams 306B and 306D). Likewise, portion 304B of the support is connected to the card body (302) by weakened attachment seam 306C (and also by a portion of weakened attachment seams 306B and 306D).

Thus, line of weakness 312A (respectively 312B) connects a point of weakened attachment seam 306B (respectively 306D) to an outside edge 314A (respectively 314B) of the support (304).

As indicated previously, a line of weakness is a line that exhibits greater weakness in relation to the surrounding area of the support, so that it can bend, and tends to break, when it is subjected to certain mechanical operations. Examples of lines of weakness are described in greater detail later with reference to FIGS. 11A to 11E.

In the example considered here, each of the weakened attachment seams (306) is also formed by a line of weakness.

In addition, each of the lines of weakness (312A and 312B) of the support (304) is such that, when the support is bent along this line of weakness until it breaks, none of the weakened attachment seams (306) breaks totally.

It is possible to vary several aspects of the support in order to guarantee that no weakened attachment seam (306) breaks when lines of weakness 312A and 312B are bent until they break. It is possible, for example, to adjust the robustness of lines of weakness 312A and 312B in relation to the weakened attachment seams (306) and/or to vary the position of lines of weakness 312A and 312B in relation to the weakened nearest attachment seams, namely weakened attachment seams 306A and 306C.

More precisely, by forming lines of weakness (312A and 312B) that are sufficiently weak in relation to the weakened attachment seams (306), it is possible to ensure that the lines of weakness are in accordance with the invention.

Furthermore, line of weakness 312A (respectively 312B) ends on a point of weakened attachment seam 306B (respectively 306D) located at distance D33 (respectively D31) from weakened attachment seam 306A, and at distance D34 (respectively D32) from weakened attachment seam 3060.

In one particular implementation, distances D31 to D34 are such that:

$D31 = D32 \pm 20\%$, and $D33 = D34 \pm 20\%$,

In the embodiment of FIG. 3, line of weakness 312A is essentially equidistant from neighbouring weakened attachment seams 306A and 306C, and/or line of weakness 312B is essentially equidistant from neighbouring weakened attachment seams 306A and 306C. In other words, D33 is equal to D34±5% and/or D31 is equal to D32±5%.

In a variant, line of weakness 312A is equidistant from weakened attachment seams 306A and 306C and/or line of weakness 312B is equidistant from weakened attachment seams 306A and 306C. In other words, D33=D34 and/or D31=D32.

In order to determine whether the lines of weakness created in the support are designed correctly, a so-called conformity test can be performed. This test consists of locally bending the support (304) along line of weakness 312A until it breaks away. Once line of weakness 312A has broken, a check is performed in order to determine whether any of the weakened attachment seams (306) has totally broken. If this is the case, it is then considered that line of weakness 312A is not in accordance with the invention. This can be explained, for example, by the fact that this line of weakness was too weak and/or located too close to the weakened attachment seam that broke On the other hand, if none of the weakened attachment seams (306A to 306D) is broken on completion of the test, it is then considered that line of weakness 312A is in accordance with the invention. The same test can then be performed for line of weakness 312B.

Figure 4:
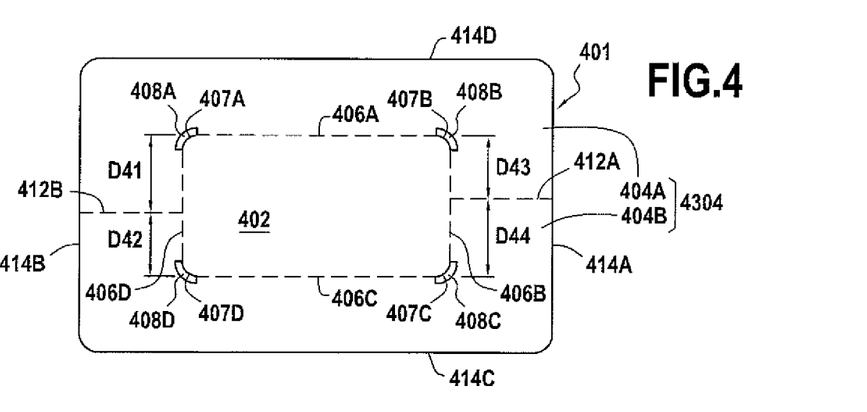
FIG. 4 schematically represents a support according to a second embodiment of the invention.

FIG. 4 represents a card (401) according to a second embodiment of the invention. In this example, the card (401) is composed of a support (404) that includes a detachable element in the form of a card body (402). In this example, the card body (402) is of essentially rectangular form and has curved border portions (407A, 407B, 407C and 407D, collectively denoted 407) at each of its corners.

The card (401) mainly differs from card 301 in that cut-out zones (408A, 408B, 408C and 408D, collectively denoted 408) respectively separate the curved border portions (407A, 407B, 407C and 407D) from the support (404). The advantages accruing from the addition of these cut-out zones will be described in greater detail later.

In the remainder of this document, the border portions of a detachable element that are separated from the support by a cut-out zone are called free border portions.

In addition, the border portions of the card body (402) that have no cut-out zone each forms a weakened attachment seam (406A, 406B, 406C and 406D, collectively denoted 406) between the card body (402) and the support (404).

The border of the card body (402) is therefore formed by:
the border portions (406), each forming a weakened attachment seam, and
the free border portions (407) which are the curved border portions of the card body (402).

In addition, in this example, the support (404) includes two lines of weakness (412A and 412B) which are used to separate the support (404) into two portions (404A and 404B) connected by a weakened attachment seam to the card body (402). More particularly, portion 404A of the support (404) is connected to the card body (402) by weakened attachment seam 406A (and also by a portion of weakened attachment seams 406B and 406D). Likewise, portion 404B of the support is connected to the card body (402) by weakened attachment seam 406C (and also by a portion of weakened attachment seams 406B and 406D).

In addition, in this embodiment, line of weakness 412A (respectively 412B) connects a point of weakened attachment seam 406B (respectively 406D) to an outside edge 414A (respectively 414B) of the support (404).

Each of lines of weakness 412A and 412B is such that, when the support is bent (404) along this line of weakness until it breaks, none of the weakened attachment seams (406) breaks totally.

In addition, line of weakness 412A (respectively 412B) ends on a point of weakened attachment seam 406B (respectively 406D) located at distance D43 (respectively D41) from weakened attachment seam 406A and at distance D44 (respectively D42) from weakened attachment seam 406O.

In the same manner as for the card (301) in FIG. 3, it is possible in particular to adapt the robustness of lines of weakness 412A and 412B and/or the position of the latter in relation to weakened attachment seams 406A and 406O in order that these lines of weakness will be in accordance with the invention. In particular, the positioning examples described previously for lines of weakness 312A and 312B on card 301 apply in the same manner to card 401.

Figure 5A:
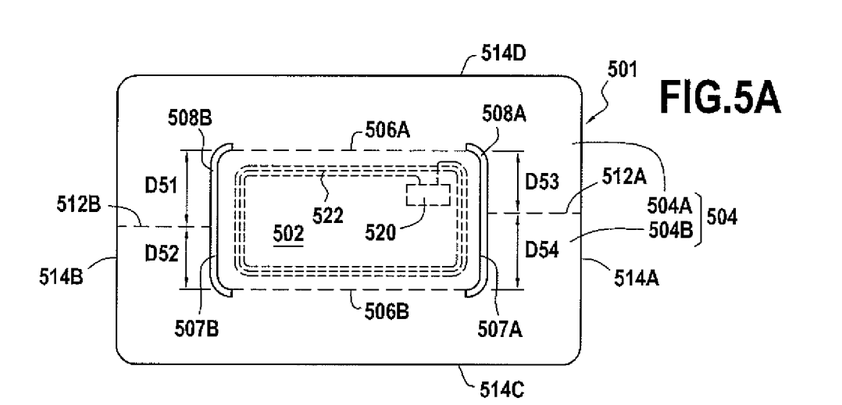
FIGS. 5A to 5G schematically represent a support according to a third embodiment of the invention, as well as the stages to be executed in accordance with one particular embodiment of the method for the detachment of the invention.

FIG. 5A represents a card ((501)) according to a third embodiment of the invention. In this example, the card (501) is composed of a support that includes a detachable element in the form of a card body. Card 501 is created by modifying the arrangement of card 401 so as to create a cut-out zone along each of free border portions 406B and 406D in order to join together cut-out zones 408B and 408C to cut-out zones 408A and 408D.

Thus, the so-called free border portions (507A and 507B, collectively denoted 507) of the card body are separated respectively from the support by cut-out zones 508A and 508B. The advantages arising from these extended cut-out zones will be described in greater detail later.

In addition, border portions 506A and 5068 (collectively denoted 506) of the card body that have no cut-out zone each forms a weakened attachment seam between the card body and the support.

The border of the card body is therefore composed:
of border portions 506A and 506B each forming a weakened attachment seam, and
free border portions 507A and 507B.

In the example considered here, each of the weakened attachment seams (506) is formed by a line of weakness represented by a broken line in FIG. 5A.

The support also includes two lines of weakness (512A and 512B) that allow the support to be separated into two portions (504A and 504B) connected by a line of weakness to the detachable element (i.e. the card body). More particularly, portions 504A and 504B of the support are connected to the card body by weakened attachment seams 506A and 506B respectively.

Each of these lines of weakness is such that, when the support is bent along this line of weakness until it breaks, none of the weakened attachment seams (506) breaks totally.

In this example, line of weakness 512A (respectively 512B) connects a point of the outside edge of cut-out zone 508A (respectively 508B) to outside edge 514A (respectively 514B) of the support.

Moreover, the junction between line of weakness 512A (respectively 512B) and the outside edge of cut-out zone 508A (respectively 508B) is located at distance D53 (respectively D51) from weakened attachment seam 506A and at distance D54 (respectively D52) from weakened attachment seam 506B.

In the same manner as for cards 301 and 401, it is possible in particular to adapt the robustness of lines of weakness 512A and 512B and/or the position of the latter in relation to weakened attachment seams 506A and 506B in order that these lines of weakness will be in accordance with the invention. In particular, the positioning examples described previously for lines of weakness 312A and 312B on card 301 apply in the same manner to card 501.

Figure 6:
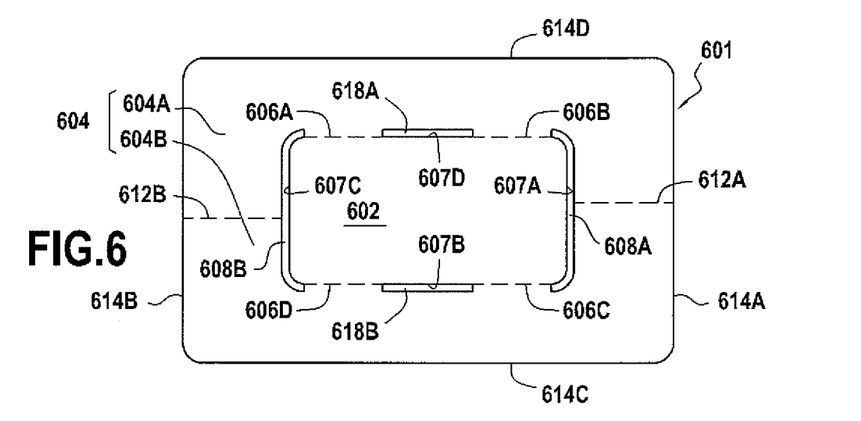
FIG. 6 schematically represents a first variant to the third embodiment illustrated in FIG. 5A.

The card (601) represented in FIG. 6 is a variant of the card (501) represented in FIG. 5. Card 601 is composed of a support (604) that includes a detachable element in the form of a card body (602). Card 601 differs uniquely from card 501 in that additional cut-out zones 618A and 618B are created along the border of card body 602, so as to reduce the length of the weakened attachment seams between the card body and the support.

Thus portion 604A of support 604 is attached to card body 602 by weakened attachment seams 606A and 606B, the latter being separated by cut-out zone 618A. Likewise, portion 604B of support 604 is attached to card body 602 by weakened attachment seams 606C and 606D, the latter being separated by cut-out zone 618B. In addition, in this example, cut-out zones 618A and 618B are not connected to an outside edge of support 608 by a line of weakness.

The advantages arising from these additional cut-out zones (618A and 618B) will be described in greater detail later.

Figure 7:
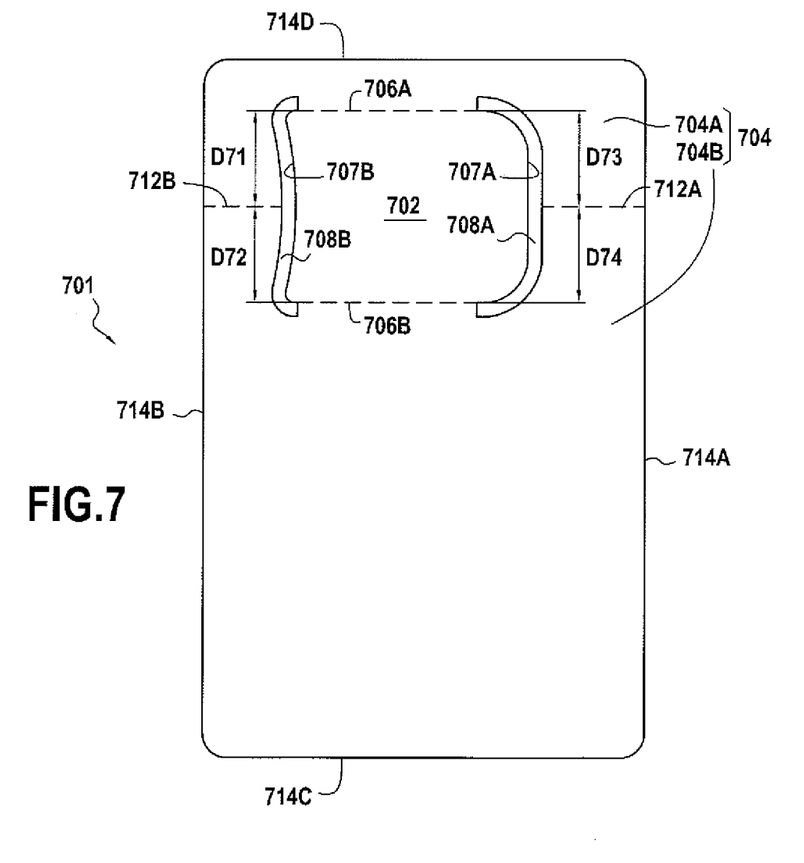
FIG. 7 schematically represents a second variant to the third embodiment illustrated in FIG. 5A.

FIG. 7 represents another variant to the creation of card 501. In this example, the card (701) is composed of a support (704) that includes a detachable element which here takes the form of a card body (702). The border portions (706A and 706B) of the card body (702) each forms a weakened attachment seam from the card body (702) to the support (704).

Moreover, cut-out zones 708A and 708B respectively separate the free border portions (707A and 707B) of the card body 702 in relation to the support (704).

The support (704) also includes two lines of weakness (712A and 712B) that allow the support to be separated into two portions (704A and 704B) connected by a line of weakness to the card body (702). More particularly, portions 704A and 704B of support 704 are connected to card body 702 by weakened attachment seams 706A and 706B respectively.

Card 701 differs mainly from card 501 in that the portion of support 704A connected to weakened attachment seam 706A is of much smaller size than the portion of support 7043 connected to weakened attachment seam 706B. As a consequence, the card body (702) is located at a greater distance from the outside edge (714C) of the support (704) than from the outside edge (714D) of the support (704). As a result, lines of weakness 712A and 712B respectively connecting cut-out zones 708A and 708B to outer edges 714A and 714B of support 704 are not located in a median zone of the support.

In addition, line of weakness 712A (respectively 712B) ends on a point of the outside edge of cut-out zone 708A (respectively 708B) located at distance D73 (respectively D71) from weakened attachment seam 706A and at distance D74 (respectively D72) from weakened attachment seam 706B.

In the same manner as for the previous embodiments, it is possible in particular to adapt the robustness of lines of weakness 712A and 712B and/or the position of the latter in relation to weakened attachment seams 706A and 706B in order that the lines of weakness will be in accordance with the invention. In particular, the positioning examples described previously for lines of weakness 312A and 312B in card 301 apply in like manner to card 701.

In addition, it will be seen that it is possible to create a second card body (not shown in FIG. 7) in the portion of support 704B between the card body (702) and outside edge 714C. In this way, it is possible to advantageously use the same support to hold two or a number of card bodies.

Figure 8:
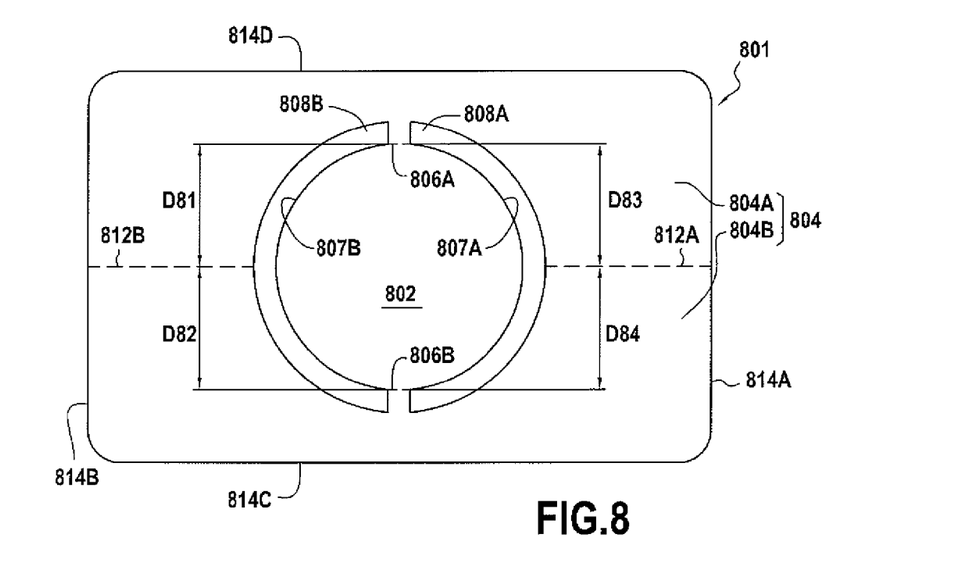
FIG. 8 schematically represents a support according to a fourth embodiment of the invention.

FIG. 8 represents a card (801) according to a fourth embodiment of the invention. In this example, the card (801) is composed of a support (804) that includes a detachable element in the form of a more-or-less circular card body 802. The border of the card body (802) includes two narrow portions (806A and 806B) attached to the support (804), each of these portions forming a weakened attachment seam from the card body (802) to the support (804).

In this example, weakened attachment seams 806A and 806B are positioned opposite to each other on the card body (802) which allows the retention of the card body (802) be optimised in relation to the support (804).

In addition, cut-out zones 808A and 808B separate the rest of the border of the card body, namely free border portions 807A and 807B respectively, from support 804.

The border of the card body (802) is thus formed by:
border portions 806A and 806B, and
free border portions 807A and 807B.

The design of the card 801 mainly differs from card 501 in that the card body (and the cut-out zones) are of circular form.

In addition, line of weakness 812A (respectively 812B) ends on a point of the outside edge of cut-out zone 808A (respectively 808B) located at distance D83 (respectively D81) from weakened attachment seam 806A, and at distance D84 (respectively D82) from weakened attachment seam 806B.

In the same manner as for the previous embodiments, it is possible in particular to adapt the robustness of lines of weakness 812A and 812B and/or the position of the latter in relation to weakened attachment seams 806A and 806B, in order that these lines of weakness will be in accordance with the invention. In particular, the positioning examples described previously for lines of weakness 312A and 312B in card 301 apply in the same manner to card 801.

Figure 9:
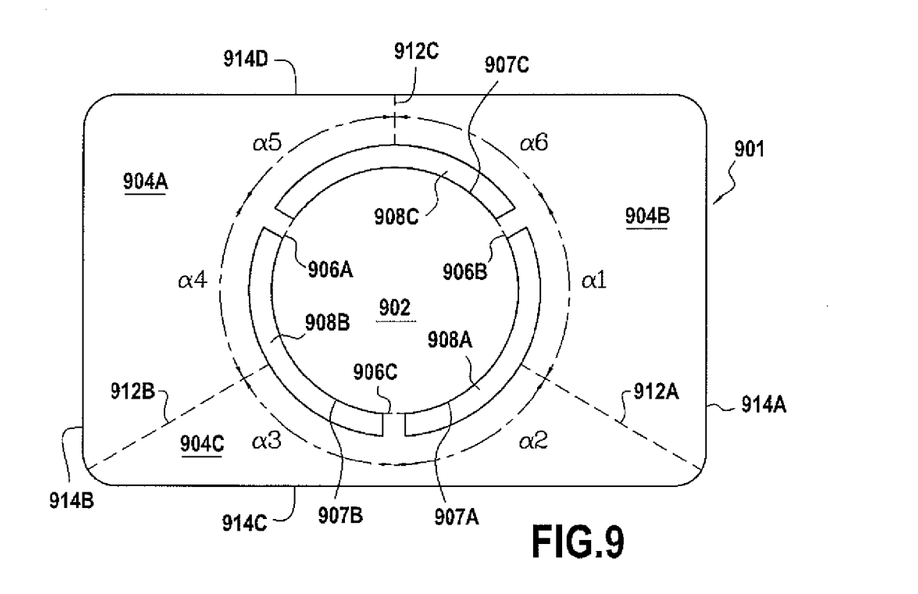
FIG. 9 schematically represents a variant to the fourth embodiment illustrated in FIG. 8.

Card 901 represented in FIG. 9 is a variant of card 801. Card 901 is composed of a support (904) that includes a detachable element which here takes the form of a more-or-less circular card body (902). Card 901 differs uniquely from card 801 in that the border of card body 902 is attached to support 904 at three border portions (906A, 906B and 906C), each of these portions forming a weakened attachment seam from card body 902 to support 904. In addition, support 904 includes three cut-out zones that are collectively denoted 908:

cut-out zone 908A ending on weakened attachment seams 906B and 906C so as to separate so-called free border portion 907A of the card body in relation to support 904,
cut-out zone 908B ending on the weakened attachment seams 906A and 906C so as to separate so-called free border portion 907B of the card body in relation to support 904, and
cut-out zone 908C ending on weakened attachment seams 906A and 906B so as to separate so-called free border portion 907C of the card body in relation to the support 904.

The border of the card body 902 is therefore formed by:
weakened attachment seams 906A, 906B and 906C (collectively denoted 906), and
free border portions 707A, 707B and 707C (collectively denoted 707).

Moreover, in this example, each of the cut-out zones (908) is connected to an outside edge of the card support (904) by a line of weakness. More particularly, line of weakness 912A connects cut-out zone 908A to the outside edge denoted 914A of card support 904. Likewise, lines of weakness 912B and 912C respectively connect cut-out zones 908B and 908C to outer edges 914B and 914C of card support 904. Lines of weakness 912A, 912B and 912C of the support thus form three distinct portions of support 904, namely:
the portion of support 904A connected to card body 902 by weakened attachment seam 906A, the portion of support 904B connected to card body 902 by weakened attachment seam 906B, and the portion of support 904C connected to card body 902 by weakened attachment seam 906C.

Moreover, each of the lines of weakness (912A, 912B and 912C) is such that, when support 904 is bent along one of these lines of weakness until it breaks, none of the weakened attachment seams (906A, 906B and 906C) breaks totally.

In the same manner as for the previous embodiments, it is possible in particular to adapt the robustness of lines of weakness 912A, 912B and 912C and/or the position of the latter in order to ensure that these lines of weakness are in accordance with the invention.

The conformity test described previously can be applied in particular in order to determine whether lines of weakness 912A, 912B and 912C are designed correctly.

More precisely, line of weakness 912A is located respectively at angular distances $\alpha 1$ and $\alpha 2$ of the two weakened nearest attachment seams, namely attachment seams 906B and 906C. Likewise, line of weakness 912B is located respectively at angular distances $\alpha 3$ and $\alpha 4$ of the two weakened nearest attachment seams (906C and 906A). Finally, the line of weakness 912C is located respectively at angular distances $\alpha 5$ and $\alpha 6$ from the weakened nearest attachment seams (906A and 906B).

In one particular method, the angular distances are such that:

$$\alpha 1 = \alpha 2 \pm 20\%$$

$$\alpha 3 = \alpha 4 \pm 20\%$$

$$\alpha 5 = \alpha 6 \pm 20\%$$

In the case represented in FIG. 9, lines of weakness 912A, 912B and 912C are each essentially equidistant to their two weakened nearest attachment seams. This means that:

$$\alpha 1 = \alpha 2 \pm 5\%$$

$$\alpha 3 = \alpha 4 \pm 5\%$$

$$\alpha 5 = \alpha 6 \pm 5\%$$

According to another alternative, the angular distances are such that:

$$\alpha 1 = \alpha 2 = \alpha 3 = \alpha 4 = \alpha 5 = \alpha 6 = 60°$$

In the embodiments described previously, the detachable element has a shape that is more-or-less rectangular or more-or-less circular.

More particularly, in the examples represented in FIGS. 3 to 6, the detachable element has a shape that is more-or-less rectangular. In each of these examples, the detachable element can, for example, have the dimensions 48 mm×25 mm, the support being in the ID-1 format for example.

It can be seen however that the detachable element can be of any shape or form. In particular, the detachable element can have at least one curved border portion and/or at least one rectilinear border portion. Furthermore, it is not necessary that the detachable element should have the border portions in parallel.

In addition, the detachable element can be a card body or any other detachable element that is capable of being attached to the support in accordance with the invention.

Moreover, it is specified that the detachable element and the support described in the different embodiments above are made from plastic. However, other materials can be used to form the detachable element and/or the support, such as a metal or metal alloy for example.

The detachment method according to one particular embodiment of the invention is here described with reference to FIGS. 5B to 5G, where these Figures illustrate the stages to be effected in order to detach the card body from the support.

To detach the card body from its support, the support must firstly be separated individually at lines of weakness 512A and 512B. To this end, the support is first bent locally along line of weakness 512A so as to break the latter (stage E10 in FIG. 5B). Portions 504A and 504B are then separated from each other in this region of the support (stage E20 in FIG. 5C). Portions 504A and 504B are then bent (stage E30) and separated (stage E40) in the same way along line of weakness 512B (FIGS. 5D and 5E). At this stage, support portions 504A and 504B are no longer attached to each other. However these portions (504A and 504B) remain connected to the card body by weakened attachment seams 506A and 506B respectively.

It will be seen that it is also possible to bend lines of weakness 512A and 512B simultaneously until they break.

Once the support has been separated at lines of weakness 512A and 512B, then weakened attachment seams 506A and 506B are broken. In this example, the weakened attachment seams are formed by lines of weakness. As a consequence, support portions 504A and 504B are bent (stage E50) and then separated (stage E60) from the card body (FIG. 5F). The bending and breaking of the weakened attachment seams 506A and can be performed sequentially or simultaneously. The card body is thus totally detached from the support (FIG. 5G).

The method for the detachment of the invention applies in the same way to the other embodiments described previously.

It should be noted that a weakened attachment seam can be formed by a narrow tab like the tab (116) illustrated in FIG. 1A, the latter either having or not having a line of weakness. In this event, it is possible, for example, to break the narrow tab constituting the weakened attachment seam by applying a pressure, a torsion force, a bending force, or a combination of at least two of these.

It will also be noted that the method for the detachment of the invention applies in the same manner whatever the shape or form of the detachable element concerned.

The invention is advantageous in that it allows one to create a detachable element of large format in relation to the format of the support, while also guaranteeing good retention of the detachable element in relation to the support.

The invention allows one, for example, to create, on a support, a detachable element of more-or-less rectangular form so that the length (or the width respectively) of this detachable element represents at least half of the length (or the width respectively) of the support.

The invention also allows one to ensure good retention of the detachable element in the attached position, regardless of the size of the latter.

In the case of FIG. 3, for example, all of the border of the detachable element (302) is attached to the support (304) (absence of cut-out zones between the border of the card body (302) and the support (304)). This arrangement enables one to guarantee optimal retention of the card body (302) in the attached position (i.e. attached to the support (304)), thus reducing the risks of damage to the card body (deformation by bending forces, etc.) and accidental breaking of weakened attachment seams 306A and 306B.

In addition, in the examples of FIGS. 5A, 6, 7, 8 and 9, the cut-out zones are arranged opposite to each other on the card body. This arrangement is used ensure that the retention of the card body along its border is uniform. On the other hand, it will be appreciated that the cut-out zones cannot be opposite to each other.

The invention is also advantageous in that it guarantees good retention of the detachable element, while also allowing easy detachment of the latter in accordance with the detachment method of the invention.

The ability to create a detachable element of large size in relation to the support has many advantages.

For example, it is currently common to use a holding tool equipped with a suction cup to manipulate a card during its manufacture. To this end, the suction cup generally attaches itself to the card body. However, good adhesion is generally possible only if the suction cup is placed onto a solid surface with no cut-out zones. The invention therefore allows the creation of a card body of large size in relation to its support, and so to employ suction cups of large dimensions, which facilitates manipulation of the card during its manufacture.

It is also possible to adapt the arrangement of the cut-out zones on the support according to the shape or form of the suction cup to be used.

In addition, for each embodiment described above, various components can be created on the card body, like a microcircuit, for example, and the means for communication with an external device.

These communication means can include, for example, flush-mounted electrical contacts (as are found on chip cards, for example) and/or a near-field communication antenna.

As an example, in the embodiment of FIG. 3, the card body (302) includes a near-field communication circuit that includes an electronic chip (320) connected to a near-field communication antenna (322). A near-field device allows the establishment of a contactless communication link with an external device for the exchange of data (according to standard ISO 14443, for example).

The antenna (322) is formed, for example, by a number of electrically conducting turns, where this antenna borders an effective magnetic field reception area. By an effective area is meant the area of the antenna which, when traversed by a magnetic field, produces an induced current that flows in the antenna (322).

Now the performance of the antenna (322) is directly linked to its size, and more precisely to the size of the effective area that it outlines. The invention is advantageous in that it provides the ability to create a card body (302) of large dimensions in relation to the card support (304), thus allowing the creation of an antenna (322) with a large effective area, the antenna therefore being more suitable to communicate with an external device.

Each of the embodiments described above is compatible with the placement of the chip (320) and of the antenna (322) represented in FIG. 3 (and likewise in FIG. 5A).

It should be noted that, in order to ensure optimal transmission of the data between such a communication circuit and an external device, the card body can be covered by a layer of magnetic screening (a ferrite layer for example). This screening layer (not shown in the Figures) in particular allows one to reduce any magnetic interference which is capable of being generated by a metallic environment located close to the communication circuit. In addition, this screening layer can be covered with an adhesive facing (not shown in the Figures). Once the card body has been detached from its support, this adhesive facing allows one to position the card body by affixing it to the surface of any support.

Furthermore, the cut-out zones described previously with reference to the different embodiments of the invention have the following advantages in particular.

The cut-out zones (408) created on the card (401) for example are advantageous in that they offer a certain degree of freedom to the card body (402) in relation to the support (404), while also retaining good retention of the card body (402) in the attached position.

These cut-out zones in particular allow the weakened attachment seams (406B and 406D) to be broken more easily once the lines of weakness (412A and 412B) have been broken. Moreover, in contrast to the arrangement of FIGS. 1A and 2, the free border portions (407) here represent a relatively small proportion of the border of the card body (402), with most of the border forming weakened attachment seams between the card body and the support. The retention of the card body (402) therefore remains of better quality than for card bodies 102 and 202, for example.

Cut-out zones 408 also allow the mechanical stresses generated on the card body (402) to be limited during its detachment, in particular when the weakened attachment seams (406) are broken.

These cut-out zones are also advantageous in that they allow all the curved border portions of the detachable element to be separated in relation to the support. In this way, it is possible to avoid the creation of curved weakened attachment seams, the latter being more difficult to former and to break than rectilinear weakened attachment seams. It is thus possible to form only rectilinear weakened attachment seams, even when the border of the detachable element includes at least one curved portion.

In addition, as illustrated in FIGS. 5B to 5F, the cut-out zones (508A and 508B) created in the card (501) offer a certain degree of freedom to the support at the lines of weakness (512A and 512B). These cut-out zones (508A and 508B) thus allow the lines of weakness (512A and 512B) to be broken more easily when using the detachment method of the invention. This is explained by the fact that the lines of weakness (512A and 512B) do not end directly on the border of the card body but end on a cut-out zone.

Figure 5B:
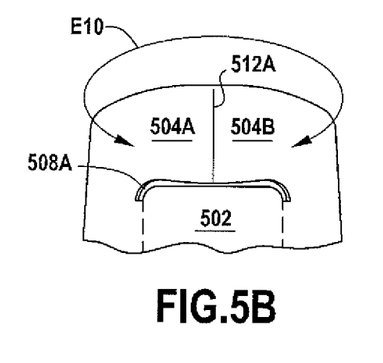
Figure 5C:
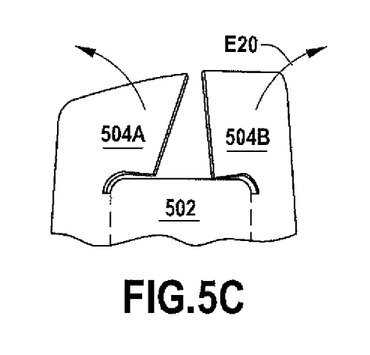
Figure 5D:
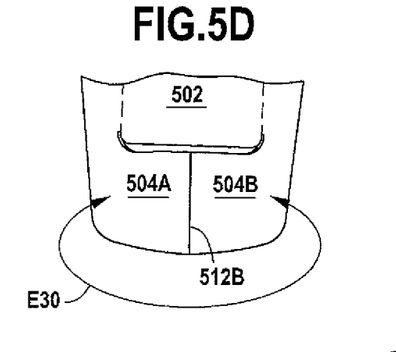
Figure 5E:
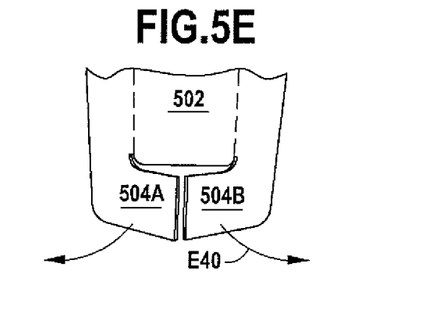
Figure 5F:
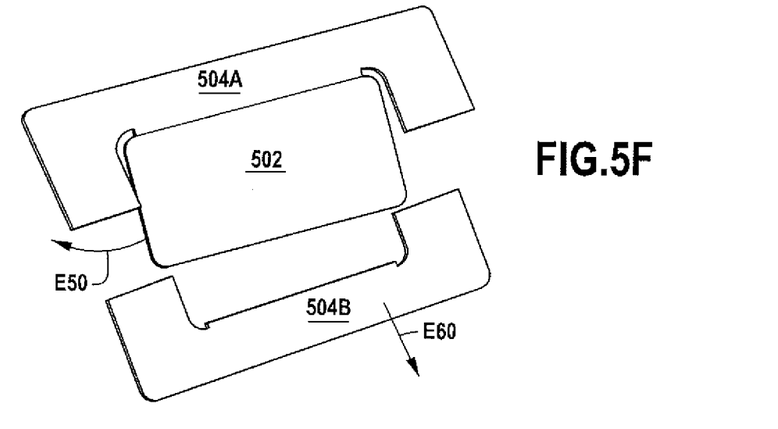
Figure 5G:
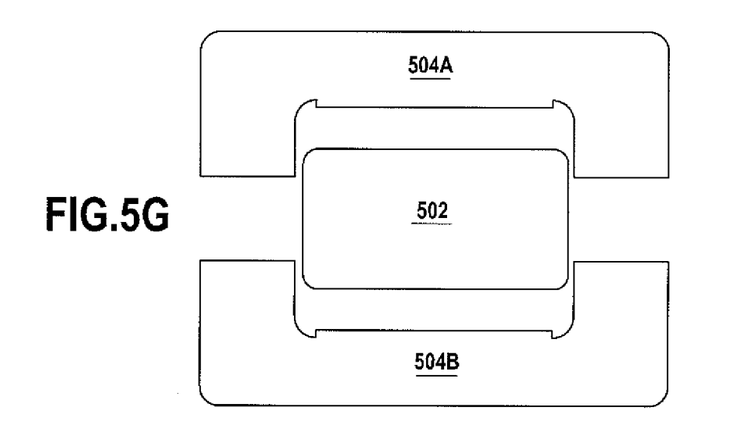

For example, the play provided by cut-out zone 508A (respectively 508B) between card body 502 and line of weakness 512A (respectively 512B) also allows the mechanical stresses generated on the card body to be limited during the detachment method, in particular when the line of weakness 512A (respectively 512B) is broken (FIGS. 5B and 5C).

Moreover, the more the line of weakness ends on a zone close to the centre of the cut-out zone concerned, the greater the play provided by the latter (and therefore the easier it is to break the line of weakness, without imposing large mechanical stresses on the card body).

It will be noted however that it is not essential that each of the lines of weakness created in the support ends on a cut-out zone (as represented in FIGS. 3 and 4, for example). A line of weakness that ends directly on the border of the card body will be more difficult to break however than a line of weakness ending on a cut-out zone.

On this point, it is also specified that when a line of weakness of the support ends on a weakened attachment seam (meaning directly on a point on the border of the detachable element), breaking of this line of weakness when using the detachment method of the invention can give rise to local breaking of the weakened attachment seam at the junction with the line of weakness concerned.

In addition, despite the fact that cut-out zones 508A and 508B are of larger size than those created in the card (401), it is possible to retain good retention of the card body in the attached position since the free border portions (507) represent a smaller proportion of the border of the card body than in the case of FIGS. 1A and 2 for example. This allows one to reduce the risks of damage to the card body (deformation by bending forces, etc.) and of accidental breaking of the weakened attachment seams.

As represented in FIGS. 6 and 8, for example, it is possible to create cut-out zones that run along a very large part of the border of the detachable element. This configuration allows one to facilitate the detachment of the detachable element, to the detriment of the quality of its retention in the attached position.

Card 601, for example, differs uniquely from card 501 in that additional cut-out zones (618A and 618B) are created along the border of the card body (602), so as to reduce the length of the weakened attachment seams between the card body and the support, and thus still further weaken the retention of card body 602 in relation to support 604.

In this event, cut-out zones 618A and 618B are not connected to an outside edge of support 608 by a line of weakness. These cut-out zones are used mainly to facilitate the detachment of the card body when the weakened attachment seams are broken.

The smaller size of weakened attachment seams 806A and 806B also allows the latter to be rectilinear despite the circular form of card body 802. As indicated previously, it is easier to create rectilinear weakened attachment seams than curved weakened attachment seams. In addition, the rectilinear shape of weakened attachment seams 806A and 806B allows the detachment of the card body to be facilitated in relation to support portions 804A and 804B once lines of weakness 812A and 812B have been broken.

For its part, card 901 represented in FIG. 9 allows the retention of the card body to be improved in relation to the arrangement of card 801, which enables the risks of damage and/or of accidental breaking to be limited as explained previously. The retention of card body 902 can be optimised when the following condition is satisfied: $\alpha 1 = \alpha 2 = \alpha 3 = \alpha 4 = \alpha 5 = \alpha 6 = 60'$.

One can also envisage a further increase in the number of weakened attachment seams holding the card body (902) in the attached position.

Furthermore, the lines of weakness created on the embodiments of FIGS. 3 to 8 are preferably in parallel in order to allow easier detachment of the detachable element in relation to its support. These lines of weakness can also be aligned in order to facilitate still further the separation of the support at the lines of weakness.

In addition, lines of weakness 512A and 512B, for example, are preferably created in a median region of the support concerned. In this way, a user can easily grasp support portions 504A and 504B in the vicinity of lines of weakness 512A and 512B in order to execute the bending (F10 and E30) and of separation (E20 and E40) stages for portions 504A and 504B. The other embodiments of the invention are also compatible with this particular arrangement.

Figure 10:
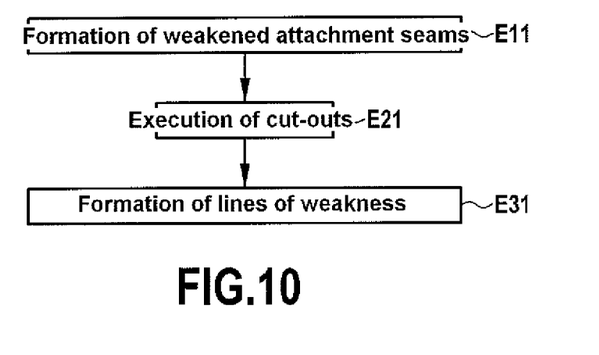
FIG. 10 represents the main stages of a manufacturing method according to a particular embodiment of the invention in the form of a flow-chart.

The manufacturing method according to one particular embodiment of the invention is now described with reference to FIG. 10 and to card 501 represented in FIG. 5.

A line of weakness is first formed on two portions of the border of card body 502 so as to form weakened attachment seams 506A and 506B connecting card body 502 to card support 504 (stage E11). These lines of weakness can be formed in various ways, as explained later in relation to the examples of FIGS. 11A to 11E.

Cut-out zones 508A and 508B are then created in card support 504 so that the portions of the border of card body 502 that have no weakened attachment seam are separated from card support 504 by the said cut-out zones (stages E21).

Once the cut-out zones have been created, lines of weakness 512A and 512B are created in card support 504 so that they respectively connect cut-out zones 508A and 508B to external edges 514A and 514B of the support (stage E31). These lines of weakness also allow the support to be separated into two portions (504A and 504B), each of these portions being connected by a weakened attachment seam (506A and 506B, respectively) to card body 502.

In addition, each line of weakness created at stage E31 is such that, when the support is bent along this line of weakness until it breaks, none of the weakened attachment seams (506A and 506B) breaks totally. In order that this condition should be observed, it is possible, for example, to adjust the robustness of lines of weakness 512A and 312B and/or their positioning in relation to weakened attachment seams 506A and 506B, as explained previously.

The conformity test described previously can be used to check whether lines of weakness 512A and 512B are designed in accordance with the invention.

It should be noted that stages E11, E21 and E31 can be carried out in any order, and that the stages described above represent only one particular example of the manufacturing method of the invention. In particular, cut-out zones 508A and 508B can be formed before lines of weakness 512A and 512B and/or before weakened attachment seams 506A and 506B. Lines of weakness 512A and 512B and weakened attachment seams 506A and 506B can also be formed sequentially in any order. However lines of weakness 512A and 512B and weakened attachment seams 506A and 506B are preferably formed simultaneously.

This manufacturing method can be applied in the same manner to manufacture the other embodiments described above.

Moreover, a line of weakness in the meaning of the invention can be formed in various ways.

Figure 11A:
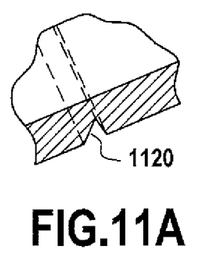
FIGS. 11A to 11E schematically represent examples of the creation of a line of weakness.
Figure 11B:
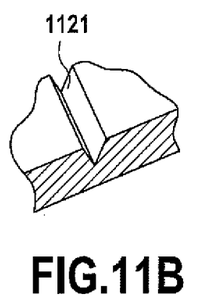
Figure 11C:
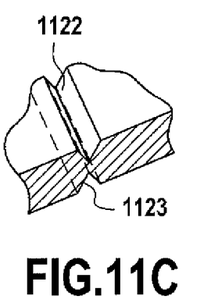
Figure 11D:
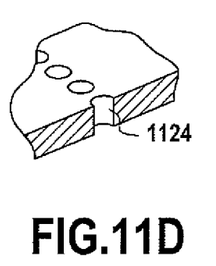
Figure 11E:
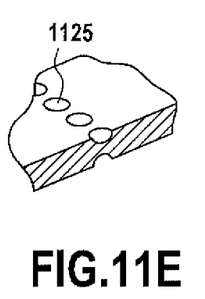

For example, as illustrated in FIGS. 11A and 11B, it is possible to form a line of weakness in a card by making a lengthwise notch on the front side (line of weakness 1120) or the read side (line of weakness 1121) of the card. it is also possible to former notches (1122 and 1123) opposite to each other on the front and rear sides of the card (FIG. 11C).

Alternatively, it is possible to form a line of weakness by making a lengthwise succession of breaking points in the card. These breaking points can, for example, be perforations (1124) passing through the card (FIG. 11D) and/or the removal of material (1125) in any shape (FIG. 11E) that locally weakens the card in a given direction and over a given length.

The invention claimed is:

1. A method for the detachment of a detachable element included on a support, wherein the detachable element has one border, of which at least a portion is attached to the support, with the border portions attached to the support all being so attached by weakened attachment seams, wherein the support also includes at least two lines of weakness that allow the support to be separated into at least two portions connected by a weakened attachment seam to the detachable element, with each of the lines of weakness being such that, when the support is bent along this line of weakness until it breaks, none of the weakened attachment seams breaks totally, and wherein said detachment method includes the following steps in succession:

bending the support along each of the lines of weakness until it breaks; and breaking the weakened attachment seams in order to detach the detachable element from said support.

2. A method for the manufacture of a support that includes a detachable element, wherein said manufacturing method includes the steps of:
creating weakened attachment seams attaching at least one portion of the border of the detachable element to the support, wherein the border portions of the detachable element attached to the support are all so attached by said weakened attachment seams; and
creating at least two lines of weakness that allow the support to be separated into at least two portions connected by a weakened attachment seam to the detachable element, with each of said lines of weakness being such that, when the support is bent along this line of weakness until it breaks, none of said weakened attachment seams breaks totally.

3. A support comprising a detachable element which has one border, of which at least a portion is attached to the support, with the border portions attached to the support all being so attached by weakened attachment seams, wherein the support also includes at least two lines of weakness that allow the support to be separated into at least two portions connected by a weakened attachment seam to the detachable element, with each of said lines of weakness being such that, when the support is bent along this line of weakness until it breaks, none of said weakened attachment seams breaks totally.

4. The support according to claim 3, wherein at least one free border portion of the detachable element is separated from said support by a cut-out zone.

5. The support according to claim 4, wherein said at least one free border portion forms more than half of the border of said detachable element.

6. The support according to claim 4, wherein the border of the detachable element includes two free border portions located opposite to each other in relation to the detachable element.

7. The support according to claim 4, wherein the border of the detachable element includes curved portions, with these curved portions all forming part of said free border portions.

8. The support according to claim 7, wherein the curved portions are said free border portions.

9. The support according to claim 4, wherein the border of the detachable element includes angles, with these angles all forming part of said free border portions.

10. The support according to claim 9, wherein the angles are said free border portions.

11. The support according to claim 4, wherein at least one said cut-out zone is connected to an outside edge of the support by one of said lines of weakness.

12. The support according to claim 11, wherein each said cut-out zone is connected to an outside edge of the support by one of said lines of weakness.

13. The support according to claim 3, comprising two weakened attachment seams, characterised in that at least the line of weakness that is closest to the two weakened attachment seams is arranged so as to satisfy the following condition:

$$D=D\pm 20\%$$

wherein D1 and D2 are the respective distances (D51, D52, D53, D54) between the at least one line of weakness and each of said two weakened attachment seams.

14. The support according to claim 13, wherein the at least one line of weakness is essentially equidistant from the two weakened attachment seams.

15. The support according to claim 3, comprising exactly two lines of weakness that are essentially parallel to each other.

16. The support according to claim 15, wherein said lines of weakness are aligned.

17. The support according to claim 3, comprising exactly two lines of weakness located in a median region of the support.

18. The support according to claim 3, wherein at least one of the weakened attachment seams is formed by a line of weakness or by a narrow tab.

19. The support according to claims 3, wherein the detachable element is a card.

20. The support according to claim 3, wherein said detachable element includes a microcircuit and means to communicate with an external device, wherein said communication means include at least one near-field communication antenna or flush-mounted electrical contacts.

21. A support comprising a detachable element which has one border, of which at least a portion is attached to the support, with the border portions attached to the support all being so attached by weakened attachment seams, wherein the support also includes at least two lines of weakness that allow the support to be separated into at least two portions connected by a weakened attachment seam to the detachable element, with each of said lines of weakness being such that, when the support is bent along this line of weakness until it breaks, none of said weakened attachment seams breaks totally, wherein the support is a card having a ID-1 format.

22. A support comprising a detachable element which has one border, of which at least a portion is attached to the support, with the border portions attached to the support all being so attached by weakened attachment seams, wherein the support also includes at least two lines of weakness that allow the support to be separated into at least two portions connected by a weakened attachment seam to the detachable element, with each of said lines of weakness being such that, when the support is bent along this line of weakness until it breaks, none of said weakened attachment seams breaks totally, wherein the support is a plastic card.

* * * * *